March 18, 1924.

T. H. THOMAS 1,487,692

FLUID PRESSURE BRAKE

Filed March 7, 1923

INVENTOR
THOMAS H. THOMAS
BY *Wm. M. Cady*
ATTORNEY

Patented Mar. 18, 1924.

1,487,692

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed March 7, 1923. Serial No. 623,538.

*To all whom it may concern:*

Be it known that I, THOMAS H. THOMAS, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to an emergency valve mechanism.

It has heretofore been proposed to provide an emergency valve mechanism comprising means operative to effect a local venting of fluid under pressure from the brake pipe, slide valves for controlling the fluid pressure for operating said means, and a piston subject to the opposing pressures of the brake pipe and a chamber for operating said slide valves.

In cases where the brake valve is provided with a full release position, the brake pipe pressure at the head end of the train may rise above the normal and if the before mentioned chamber of the emergency valve mechanism is charged from the brake pipe through a relatively large port, the chamber is liable to become overcharged, so that when the brake pipe settles down to the normal pressure upon movement of the brake valve to running position, the emergency valve mechanism is liable to be shifted to emergency position when not intended, due to the excess pressure in the chamber. It is therefore desirable to provide a restricted communication through which the emergency valve chamber is charged from the brake pipe.

It has also been proposed to include in the emergency valve mechanism, a quick service feature, by which a local venting of fluid from the brake pipe is effected in a service application of the brakes.

For quick service a relatively large port is required, but with such a port there is a tendency to lift the slide valve from its seat due to the brake pipe pressure in said port acting on the face of the valve.

The principal object of my invention is to provide an emergency valve mechanism of the above character having means for preventing the unseating of the emergency slide valves and means for restricting the charging of the emergency valve chamber.

Other objects and advantages will appear in the following more detailed description of the invention.

Figure 1:
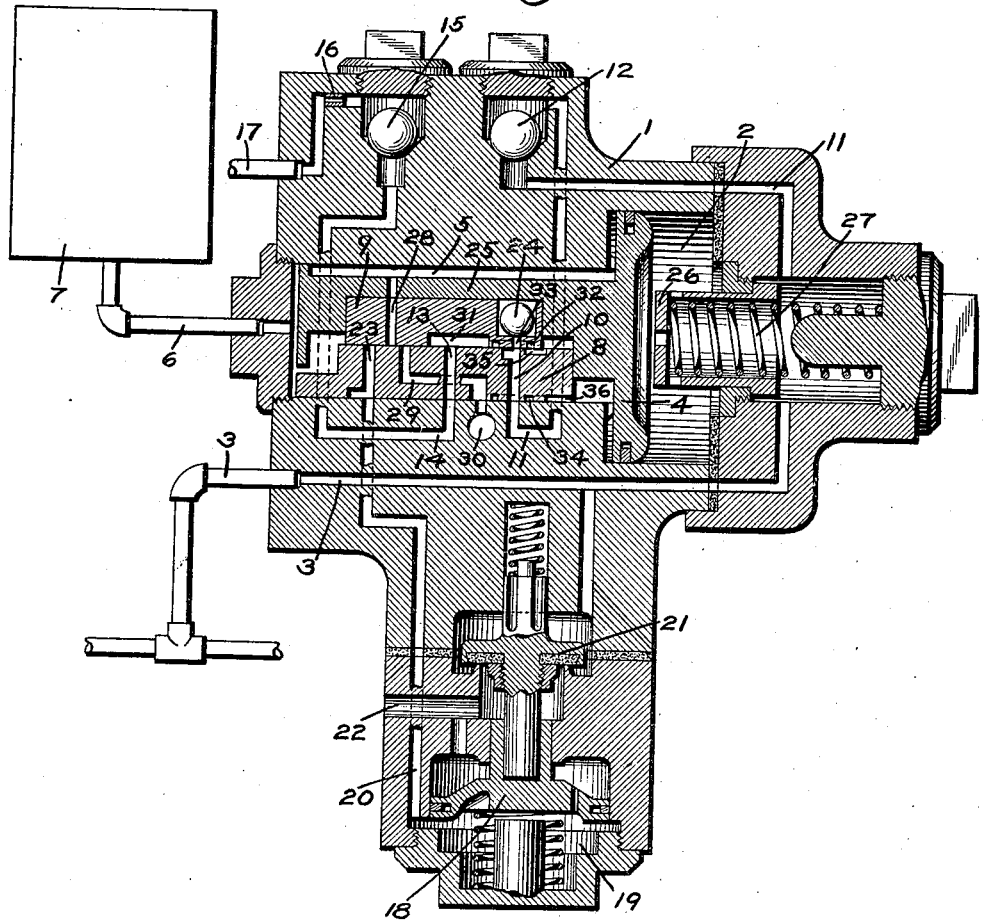

In the accompanying drawing; Fig. 1 is a central sectional view of an emergency valve mechanism embodying my invention; and Fig. 2 a fragmentary section showing a slightly modified form of my invention.

As shown in the drawing, the emergency valve mechanism may comprise a casing 1 having a piston chamber 2 connected to the usual brake pipe 3 and containing a piston 4 and having a valve chamber 5, connected by pipe 6 to chamber 7 and containing a main slide valve 8 and an auxiliary slide valve 9 adapted to be operated by piston 4.

The main slide valve 8 is provided with a through quick service port 10 adapted to register with a passage 11 containing a ball check valve 12 and communicating with the brake pipe 3 and a quick service port 13 adapted to register with a passage 14 containing a ball check valve 15 and communicating through a restricted passage 16 with a pipe 17 leading to the brake cylinder.

The quick action valve device may comprise a piston 18 contained in piston chamber 19, said chamber having a passage 20 which leads to the seat of slide valve 8. The piston 18 is adapted to operate a vent valve 21 for venting fluid from the brake pipe passage 3 to an atmospheric exhaust port 22. The passage 20 registers with a through port 23 in the slide valve 8.

According to my invention, a cavity is provided in the auxiliary slide valve 9 which contains, according to the construction shown in Fig. 1, a ball 24 which closely fits the cylindrical walls of the cavity but yet having sufficient clearance to provide a restricted communication around the ball through which the valve chamber 5 is charged with fluid under pressure from the brake pipe 3. The ball 24 is free to engage the stem 25 of the piston 4 so that fluid pressure below the ball tends to react to hold the slide valves seated.

In operation, when the brake pipe 3 is charged with fluid under pressure, fluid from the brake pipe flows through the passage 11 past the check valve 12 and through the port 10 to the cavity containing the ball 24. Fluid then flows to valve chamber 5 and the quick action chamber 7 by way of the restricted communication afforded around the ball 24.

If a reduction in brake pipe pressure is made at a service rate, the piston 4 will move outwardly until the piston engages the movable stop 26 which is yieldingly positioned by a spring 27.

In this position, the auxiliary valve 9 has moved relatively to the main valve 8, but not sufficiently to uncover the port 23. This movement however is sufficient to cause the port 28 to register with a port 29 in the main slide valve 8. Since the port 29 registers with an exhaust port 30, fluid will be vented from the valve chamber 5 and the quick action chamber 7, so that any further outward movement of the piston 4 is prevented.

In this movement, a cavity 31 connects port 10 with port 13, so that fluid from the brake pipe 3 is vented through passage 14 to produce a local venting of fluid from the brake pipe and the well known quick serial action in a service application of the brakes.

If an emergency reduction in brake pipe pressure is effected, the piston 4 will be suddenly shifted to its emergency position, compressing the spring 27 and in this position, the auxiliary slide valve 9 has moved relatively to the slide valve 8, so that the port 23 is uncovered, permitting the flow of fluid from valve chamber 5 and the quick action chamber 7 through passage 20 to piston chamber 19. The quick action piston 18 is then shifted so as to open the vent valve 21 and thus cause an emergency venting of fluid from the brake pipe to produce the well known quick serial action in emergency.

In recharging, upon movement of the brake valve to release position, fluid flows from the brake pipe through passage 11 and port 10 to the cavity containing the ball 24 and the recharge of the valve chamber 5 is restricted by flow around the ball 24 so that said chamber is prevented from becoming overcharged, even if the brake pipe pressure is raised above normal and although the emergency valve mechanism may be located near the head end of the train. At the same time, the fluid pressure acting below the ball 24 operates to raise the ball as a piston, so that the ball engages the stem 25 and the pressure then tends to react on the slide valves 8 and 9 so as to hold said valves to their seats.

A tight fitting piston or ball is undesirable, as it has been found very difficult to maintain such a piston in the desired working condition.

A groove 32 encircles the port 33 in the auxiliary slide valve 9 and a similar groove 34 encircles the port 10 at the seating face of the valve. The groove 32 being connected by a small port 35 with the valve chamber 5 and the groove 33 by a small port 36.

If there should be any unevenness of the slide valve seating face or imperfect seating thereof, the area exposed to brake pipe pressure will be limited to a predetermined maximum area as defined and limited by the grooves 32 and 34 and any leakage past the area will be vented through the respective ports 35 and 36 to the valve chamber 5.

Figure 2:
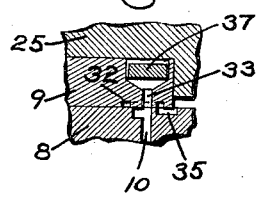

While the ball 24 as shown in Fig. 1 is preferred, a disk 37, such as shown in Fig. 2 might be employed, the disk 37 fitting in the cylindrical cavity in the auxiliary valve 9, so as to provide a restricted communication around the disk, as in the case of the ball 24.

Having now described my invention, what I claim as new and desire to secure by Letters Patent, is:—

1. In a fluid pressure brake, the combination with a valve mechanism having a valve provided with a port through which fluid under pressure is supplied, of a movable member mounted in said valve and subject to the pressure of fluid supplied to said port, whereby the pressure in said port reacts on the valve to hold same to its seat.

2. In a fluid pressure brake, the combination with a valve mechanism having a valve provided with a port through which fluid under pressure is supplied, of a movable ball mounted in a cavity in said valve and subject to the pressure of fluid supplied to said port.

3. In a fluid pressure brake, the combination with a valve mechanism having a valve provided with a port through which fluid under pressure is supplied, of a movable member mounted in a cavity in said valve and adapted to provide a restricted communication for the flow of fluid from said port around said member.

4. In a fluid pressure brake, the combination with a valve mechanism having a valve provided with a port through which fluid under pressure is supplied, of a loosely fitting member mounted in a cavity in said valve and subject to the pressure of fluid supplied to said port, whereby the pressure of fluid supplied reacts on the valve to hold same to its seat.

5. In a fluid pressure brake, the combination with a valve mechanism having a valve provided with a port through which fluid under pressure is supplied, of a loosely fitting ball mounted in said valve and subject to the pressure of fluid supplied through said port.

6. In a fluid pressure brake, the combination with a brake pipe and a valve mechanism having a piston subject to the opposing pressures of the brake pipe and a chamber and a valve operated by said piston and having a port through which fluid is vented from the brake pipe upon a service reduction in brake pipe pressure, of a movable member subject to the pressure of fluid in said port, whereby the pressure of fluid reacts to hold the valve seated.

7. In a fluid pressure brake, the combination with a brake pipe and a valve mechanism having a piston subject to the opposing pressures of the brake pipe and a chamber and a valve operated by said piston and having a port through which fluid is vented from the brake pipe upon a service reduction in brake pipe pressure and through which fluid is supplied to said chamber, of a movable member subject to the pressure of fluid in said port and providing a restricted communication through which fluid is supplied to said chamber.

8. In a fluid pressure brake, the combination with a brake pipe and a valve mechanism comprising a main valve having a port through which fluid is vented from the brake pipe upon a service reduction in brake pipe pressure, an auxiliary valve, and a piston subject to the opposing pressures of the brake pipe and a chamber for operating said valves, of a movable member mounted in said auxiliary valve and subject to the pressure of fluid in said port.

9. In a fluid pressure brake, the combination with a brake pipe and a valve mechanism comprising a main valve having a port through which fluid is vented from the brake pipe upon a service reduction in brake pipe pressure, an auxiliary valve, and a piston subject to the opposing pressures of the brake pipe and a chamber for operating said valves, of a movable member loosely fitting a cavity in the auxiliary valve and subject to the pressure of fluid in said port whereby said pressure reacts to hold said valves seated, said member providing a restricted communication, through which said chamber is charged with fluid under pressure from the brake pipe.

10. In a fluid pressure brake, the combination with a brake pipe, and an emergency valve mechanism comprising a main valve having a port through which fluid is vented from the brake pipe in a service application of the brakes, an auxiliary valve mounted on the main valve, and a piston subject to the opposing pressures of the brake pipe and a chamber and having a stem for operating said valves, of a cylindrical cavity in said auxiliary valve and a movable member loosely fitting said cavity and operated by fluid pressure in said port for engaging said piston stem.

11. In a fluid pressure brake, the combination with a brake pipe, and an emergency valve mechanism comprising a main valve having a port through which fluid is vented from the brake pipe in a service application of the brakes, an auxiliary valve mounted on the main valve, and a piston subject to the opposing pressures of the brake pipe and a chamber and having a stem for operating said valves, of a cylindrical cavity in said auxiliary valve and a ball loosely fitting said cavity to provide a restricted communication from said port to said chamber and operated by fluid pressure in said port for engaging said piston stem.

12. In a fluid pressure brake, the combination with a valve mechanism having a slide valve provided with a port through which fluid under pressure is supplied, of a groove at the seat of said valve encircling said port.

13. In a fluid pressure brake, the combination with a valve mechanism having a slide valve provided with a port through which fluid under pressure is supplied, of a groove at the seat of said valve encircling said port and a vent port leading from said groove.

14. In a fluid pressure brake, a valve mechanism having a slide valve provided with a port through which fluid under pressure is supplied, said valve having a groove at its seating face encircling said port.

15. In a fluid pressure brake, a valve mechanism having a valve chamber containing a slide valve provided with a port through which fluid under pressure is supplied, said valve having a groove at its seating face encircling said port and a port leading from said groove to said chamber.

In testimony whereof I have hereunto set my hand.

THOMAS H. THOMAS.